United States Patent
Correa et al.

(10) Patent No.: US 11,775,266 B2
(45) Date of Patent: Oct. 3, 2023

(54) SELF-JOINING MODE FOR SHARED COLLABORATIVE CHANNEL

(71) Applicant: Microsoft Technology Licensing, LLC, Redmond, WA (US)

(72) Inventors: Rafael Bussioli Alves Correa, Kirkland, WA (US); Arjun Kumar Kalluri, Woodinville, WA (US); Michael Thomas McLean, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 17/490,046

(22) Filed: Sep. 30, 2021

(65) Prior Publication Data
US 2023/0094554 A1 Mar. 30, 2023

(51) Int. Cl.
*G06F 8/38* (2018.01)
*H04L 65/1093* (2022.01)
(Continued)

(52) U.S. Cl.
CPC .............. *G06F 8/38* (2013.01); *H04L 9/0825* (2013.01); *H04L 63/0236* (2013.01);
(Continued)

(58) Field of Classification Search
CPC . G06F 8/38; G06F 3/048; G06F 16/54; G06F 9/4451; G06F 16/986;
(Continued)

(56) References Cited

U.S. PATENT DOCUMENTS 11,526,911 B2 * 12/2022 Harper .................... H04W 8/00
2010/0306393 A1 12/2010 Appiah et al.
(Continued)

FOREIGN PATENT DOCUMENTS

WO 2013170346 A1 11/2013
WO 2015164521 A1 10/2015

OTHER PUBLICATIONS

"Slack Technologies (WORK) Q3 2020 Earnings Call Transcript", Retrieved from: https://www.fool.com/earnings/call-transcripts/2019/12/05/slack-technologies-work-q3-2020-earnings-call-tran.aspx, Dec. 5, 2019, 30 Pages.
(Continued)

*Primary Examiner* — Kyung H Shin

(57) ABSTRACT

Systems and methods for inviting an external user to join a shared collaborative channel are provided. In particular, a computing device may generate a common channel invitation for one or more users and cause the common channel invitation to be transmitted to the one or more users. The common channel invitation may include an invitation link to a shared collaborative channel and a selectable option to redeem the common channel invitation to the shared collaboration channel. The computing device is further monitor whether the one or more users access the shared collaborative channel via the invitation link, and in response to detecting that at least one of the one or more users is accessing the shared collaborative channel via the invitation link, allow the at least one user to view at least some content of the shared collaborative channel.

19 Claims, 13 Drawing Sheets

(51) Int. Cl.
*H04L 65/401* (2022.01)
*H04W 8/00* (2009.01)
*H04L 9/40* (2022.01)
*H04L 9/08* (2006.01)

(52) U.S. Cl.
CPC ...... *H04L 65/1093* (2013.01); *H04L 65/4015* (2013.01); *H04W 8/00* (2013.01)

(58) Field of Classification Search
CPC .. G06F 3/0484; G06F 16/9577; G06F 3/0481; G06Q 50/01; G06Q 30/0267; G06Q 30/0261; G06Q 30/02; H04W 8/00; H04W 4/023; H04W 12/068; H04L 51/58; H04L 12/1827; H04L 9/40; H04L 67/01; H04L 12/1859; H04L 67/10; H04L 67/14; H04L 67/04; H04L 41/22; H04L 67/02; H04L 65/4015; H04L 67/52; H04L 12/18; H04L 63/0236; H04L 67/141; H04L 9/0825; H04L 9/0819; H04L 63/104; H04L 63/065; H04L 9/0891; H04L 9/0894; H04L 9/14; H04L 9/0861; H04L 9/0833; H04L 9/0822
See application file for complete search history.

(56) References Cited

U.S. PATENT DOCUMENTS

| | | | |
|---|---|---|---|
| 2011/0023096 A1* | 1/2011 | Xiao | H04L 63/0236 709/224 |
| 2014/0089777 A1* | 3/2014 | Roiniotis | G06F 8/38 715/234 |
| 2021/0167954 A1* | 6/2021 | Weiss | H04L 9/0825 |

OTHER PUBLICATIONS

"International Search Report and Written Opinion Issued in PCT Application No. PCT/US22/039761", dated Nov. 9, 2022, 15 Pages.

* cited by examiner

SELF-JOINING MODE FOR SHARED COLLABORATIVE CHANNEL

BACKGROUND

A collaborative platform provides a collaborative workspace to allow a team within an organization to stay connected and productive by providing easy access to team members, documents, and information. Expanded connectivity enables team members to make informed decisions and improve efficiency. Recent enhancements in collaboration platforms, further improve upon sharing documents, tracking tasks, e-mail efficacy, and idea and information sharing. However, oftentimes the collaborative workspace does not provide means to allow collaboration between individuals in different teams within the organization and/or collaboration with individuals or teams outside the organization. Additionally, specific user information (e.g., an identity of each user, an identity of team and/or organization that each user belongs to, etc.) may be required to invite users to join the collaborative workspace. Even when the invitation is sent to a user, the user may not redeem the invitation because of unfamiliarity with the collaborative workspace.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In aspects, a method for inviting an external user to join a shared collaborative channel is provided. The method includes generating a common channel invitation for one or more users and causing the common channel invitation to be transmitted to the one or more users. The common channel invitation includes an invitation link to a shared collaborative channel and a selectable option to redeem the common channel invitation to the shared collaboration channel. The method further includes monitoring whether the one or more users access the shared collaborative channel via the invitation link. In response to detecting that at least one of the one or more users is accessing the shared collaborative channel via the invitation link, the method includes allowing the at least one user to view at least some content of the shared collaborative channel and determining whether the at least one user has redeemed the common channel invitation via the invitation link. In response to determining that the at least one user has redeemed the common channel invitation, the method includes adding the at least one user as a confirmed member to a roster of the shared collaborative channel.

In further aspects, a computing device for inviting an external user to join a shared collaborative channel is provided. The computing device including a processor and a memory having a plurality of instructions stored thereon that, when executed by the processor, causes the computing device to perform operations. The operations include generating a common channel invitation for one or more users and providing the common channel invitation to the one or more users. The common channel invitation includes (1) an invitation link to a shared collaborative channel, (2) a selectable option to redeem the common channel invitation to the shared collaboration channel, and (3) a limited set of permissions for the at least one user who accesses the shared collaborative channel via the invitation link. The operations further include monitoring whether the one or more users access the shared collaborative channel via the invitation link, and in response to detection of at least one of the one or more users accessing the shared collaborative channel via the invitation link, allowing the at least one user to view at least some content of the shared collaborative channel. Additionally, the operations include determining whether the at least one user has redeemed the common channel invitation via the invitation link, and in response to determination that the at least one user has redeemed the common channel invitation, adding the at least one user as a confirmed member to a roster of the shared collaborative channel.

In yet further aspects, a non-transitory computer-readable medium storing instructions for inviting an external user to join a shared collaborative channel is provided. The instructions when executed by one or more processors of a computing device, cause the computing device to perform operations. The operations include generating a common channel invitation for one or more users and causing the common channel invitation to be transmitted to the one or more users. The common channel invitation includes an invitation link to a shared collaborative channel and a selectable option to redeem the common channel invitation to the shared collaboration channel. Additionally, the operations further include monitoring whether the one or more users access the shared collaborative channel via the invitation link, and in response to detection of at least one of the one or more users accessing the shared collaborative channel via the invitation link, allowing the at least one user to view at least some content of the shared collaborative channel. The operations further include determining whether the at least one user has redeemed the common channel invitation via the invitation link, and in response to determination that the at least one user has redeemed the common channel invitation, adding the at least one user as a confirmed member to a roster of the shared collaborative channel.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
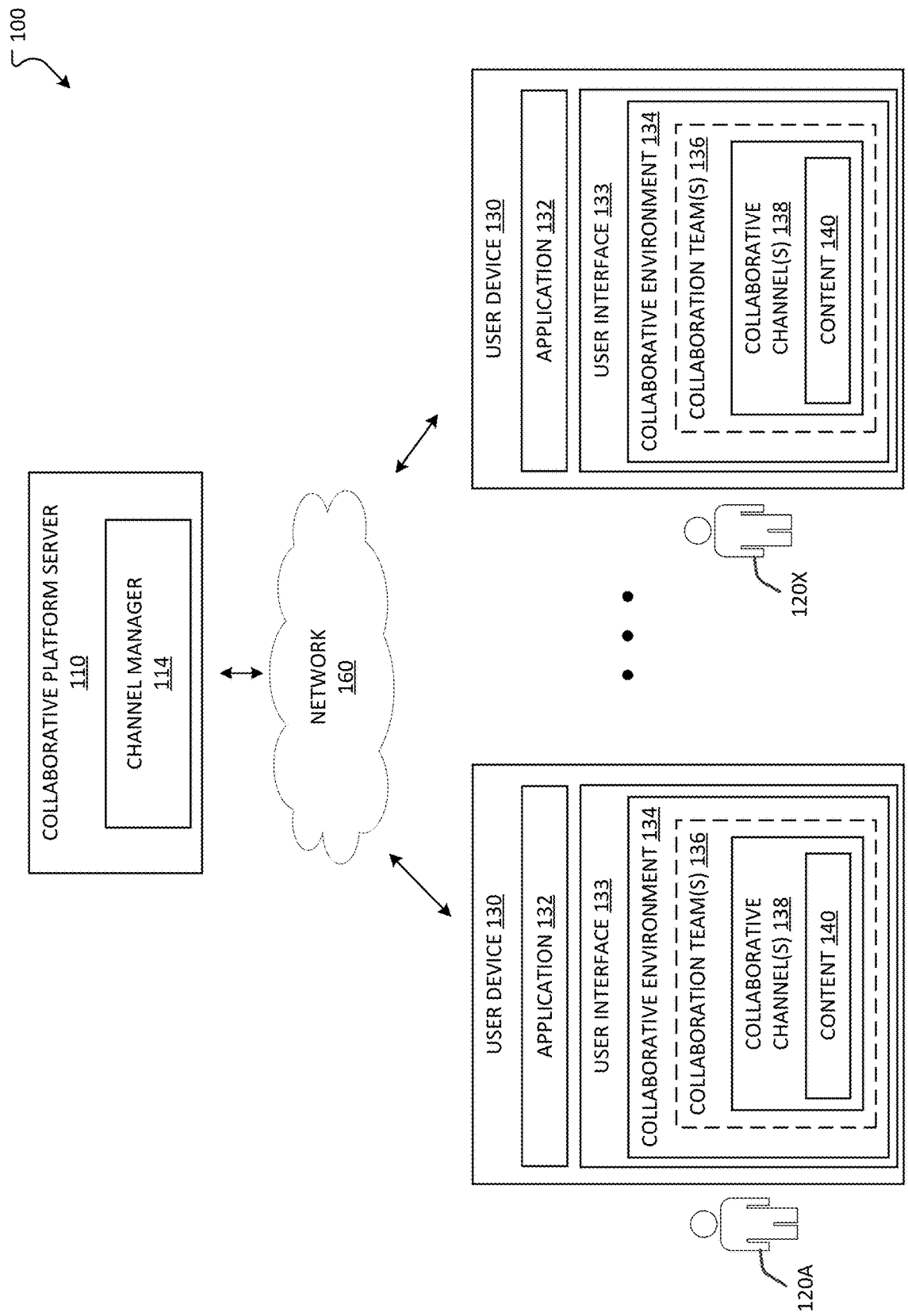
FIG. 1 depicts details directed to a collaborative communication system for facilitating collaborations between users in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a collaborative communication system allows individuals or collaboration teams in an organization (also referred to as a tenant) to create a collaborative enterprise environment on a collaborative platform (e.g., Microsoft® Teams®) with other individuals or collaboration teams within the organization and/or with other individuals or collaboration teams that belong to a different organization. Each user of the collaborative platform may customize the user's collaborative environment. Each collaboration team includes a group of team members and may have more than one collaborative channel shared among the team members. For example, a member of a collaboration team in an organization may create a collaborative channel to work on a project with other individuals in the same collaboration team and/or one or more members from a different collaboration team in the same organization. Collaboration may involve phone calls (e.g., IP-based calls), chat threads, email threads, channel conversations, document sharing, task tracking, and the like. Additionally, or alternatively, the collaborative channel may be shared with one or more individuals or teams outside of the organization (e.g., an external organization).

Each individual who has been invited or added to the collaborative channel may be assigned a specific set of rights (e.g., to access and interact with content in the collaborative channel) based at least in part on a type of the collaborative channel and an identity of the individual (e.g., within or outside the collaboration team, internal or external of the organization). For example, the type of a collaborative channel (e.g., standard, private, and shared) may be defined by an individual when creating the collaborative channel (also referred to as an owner of the collaborative channel). It should be appreciated that, in some aspects, the owner and/or one or more authorized members of the collaborative channel may modify the type of collaborative channel after the collaborative channel has been created. Additionally, it should also be appreciated that there may be multiple owners associated with the collaborative channel and owners may have additional authority to make changes to the collaborative channel than other members. As described above, regardless of the type of collaborative channel, an individual who is not a member of the collaboration team may be invited and/or added to the collaborative channel as a channel-only member. Additionally, in some aspects, a member of the collaboration team may also be explicitly added to a particular collaborative channel as a channel-only member. In such aspects, if the member is removed from the collaboration team, the member will retain access to the particular collaborative channel to which the member was added as the channel-only member.

As described above, the type of a collaborative channel may include standard, private, and shared. The standard collaborative channel is configured to establish an open collaboration within the collaboration team and inherits a roster (e.g., a full membership list) corresponding to the collaboration team. In other words, the standard collaborative channel and its contents are visible to every team member in the collaboration team. Even so, the owner of the collaborative channel may still maintain more rights than the other team members, such as rights to make changes to the roster, schedule meetings, grant rights to other members, and the like. It should be appreciated that, in some aspects, the standard collaborative channel may be public. For example, users in the same organization may access content in standard public channels.

The private collaborative channel is a channel where membership may be a subset of the team members in a collaboration team and/or a subset of members of an organization more broadly. The private collaborative channel and its contents are hidden from other team members (or organization members) who are not members of the private collaborative channel. For example, anyone in the collaboration team may create a private collaborative channel and invite one or more particular team members in the collaboration team to access the private collaborative channel. In fact, a team owner (e.g., a person who created the collaboration team) may not be a member of the private collaborative channel.

The shared collaborative channel allows cross-team collaboration between multiple collaborative teams within the same organization or across multiple organizations. The shared collaborative channel allows members in different teams to collaborate as if they were all members of the same collaboration team. When a shared collaborative channel is created, the originating member may be referred to as an originating owner. The originating owner is a member of an originating organization (e.g., internal organization) and may be (but is not required to be) a member of an internal collaboration team, for instance. The originating owner may invite members to the shared collaborative channel from different collaboration teams (e.g., internal collaboration teams) within the same organization (e.g., internal organization) and/or may invite members from different organizations (e.g., external organizations). If a member is associated with the same organization as the originating owner, the member is an internal member; whereas if a member is not associated with the same organization as the originating owner, the member is an external member. An internal member may be granted rights of an owner by the originating owner, which may include some or all of the rights held by the originating owner. In aspects, an external member may be granted rights as an external owner, but may not be granted all of the rights of an internal designated owner or the originating owner. That is, an external designated owner may not have rights to add or remove internal members from the membership roster of the shared collaborative channel but may have rights to add or remove external members (e.g., users from the same organization as the external designated owner). For example, if Organization A is collaborating with an external consulting firm like Organization B on a project, Organization A may not know how many individuals Organization B has allocated or when consultants will roll on or off the project. In such an example, Organization A may delegate managing a list of users within Organization B to an external owner member of Organization B. This allows Organization A to easily collaborate with Organization B without having to identify and update each and every consultant that rotates throughout the project.

Figure 4A:
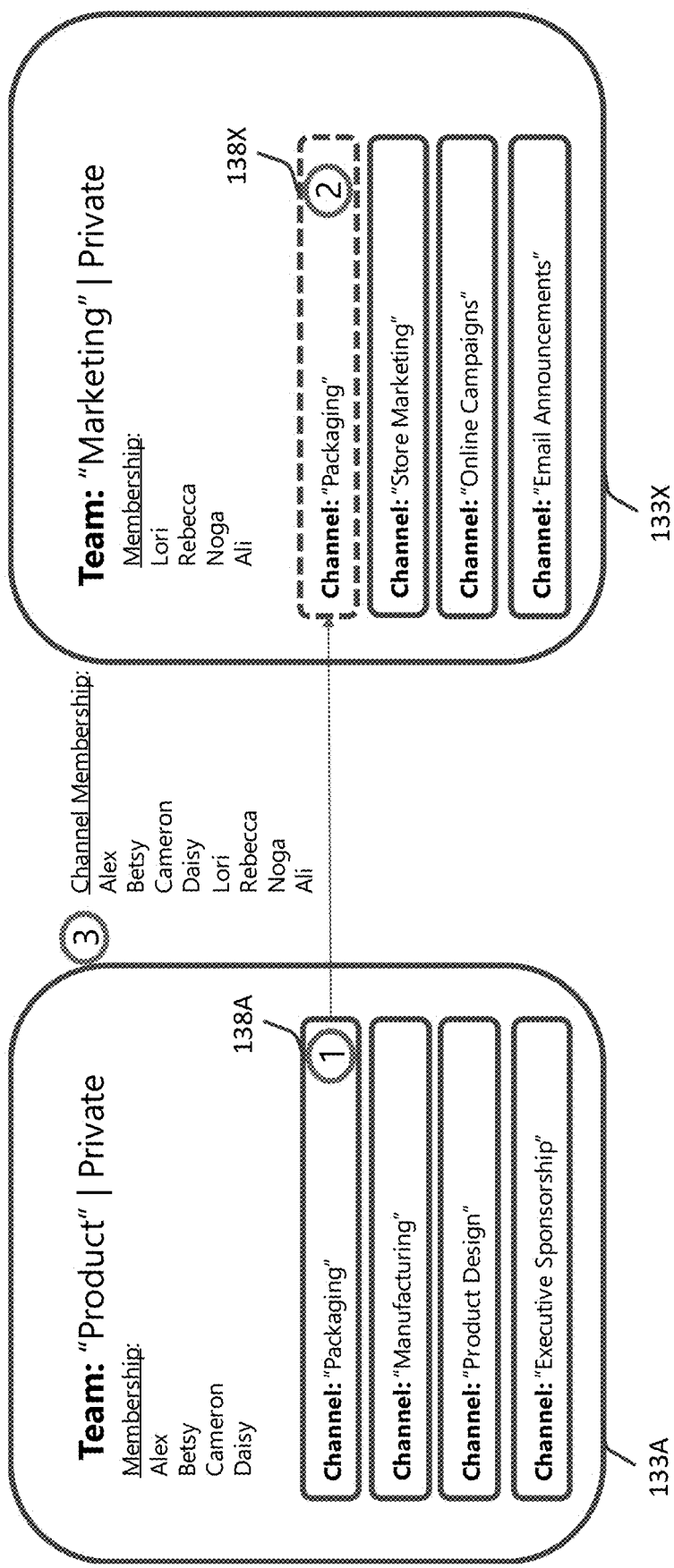
FIGS. 4A and 4B depict example user interfaces of computing devices when a collaborative channel is shared between an originating team (e.g., "Product" Team) and a recipient team (e.g., "Marketing" Team) in accordance with examples of the present disclosure.
Figure 4B:
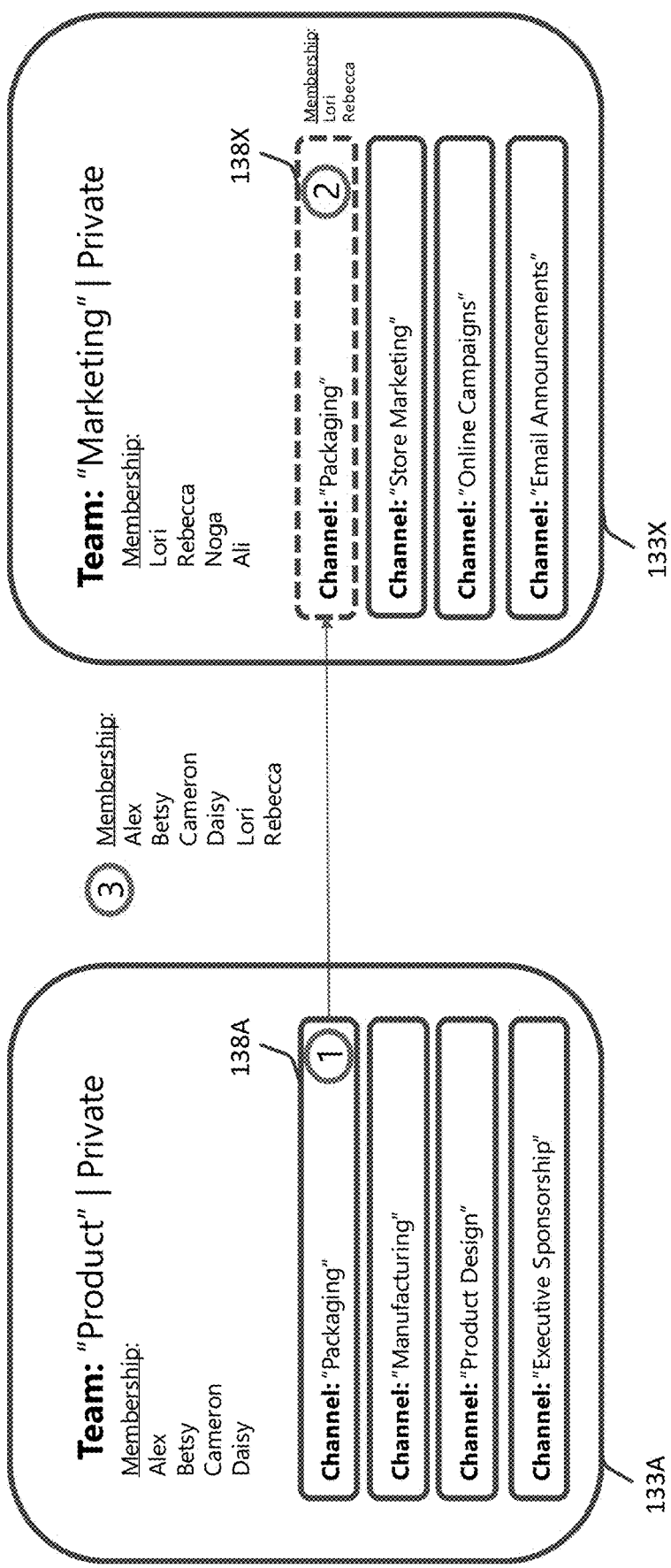

Additionally, each member of a shared collaborative channel may choose to add or link the shared collaborative channel directly to one or more of the member's collaboration teams (e.g., a member's primary collaboration team), as shown in FIGS. 4A and 4B. This prevents the member from needing to move out of context from one collaboration team to view content in the shared collaborative channel, which may be associated with a different collaboration team of the same organization or with a different organization entirely. It should be appreciated that edits (e.g., additions, deletions, changes) made to the content in the collaborative channel may be reflected in near real-time across user systems. For example, while an edit is being made to the content on one user system, the edit may be reflected at substantially (or nearly) the same time on another user system. "Near" real-time (or substantially real-time) may account for a minimal delay associated with transmission and synchronization of changes due to resource availability, processing speeds, network bandwidth, and the like.

In the illustrative aspect, when a new private or shared collaborative channel is created, a new channel group may be provisioned within a resource tenant (e.g., where the new private or shared collaborative channel lives). The new channel group is associated with the new collaborative channel and serves as an authority for membership (e.g., an identity management directory) inside the new collaborative channel. For example, the channel group may contain a roster that includes a list of users and computers that are authorized to access resources or content associated with the collaborative channel. As such, a direct mapping (e.g., a 1:1 mapping) is established between the collaborative channel and the channel group. The channel group includes a group database for storing content (e.g., membership, messages, calendar entries) that is shared between members of the associated collaborative channel. Such content may be received, uploaded, or otherwise generated by the members and may be made available to multiple applications accessible by the members, including the collaborative platform, a calendar/messaging application, a planner application, a notebook application, and the like. It should be appreciated that the channel group is independent from other identity management directories (e.g., Azure Active Directory) that may be associated with the collaboration team.

By creating a collaborative channel with its own channel group, an individual may be added to a specific collaborative channel (e.g., channel-only members) for collaboration without being a member of the collaboration team. This allows the collaborative communication system to limit the access of channel-only members to content of the specific collaborative channel only. It should be appreciated that this is a significant improvement over current collaborative systems where all channels within a collaboration team share the same roster (e.g., same identity management directory) and the same group database, which in the case of a shared channel would result in all members, including users outside of the resource tenant (e.g., from different tenants), to have at least read access all content of the collaborative team. By bifurcating the membership roster of a shared collaborative channel from the general organizational directories, additional flexibility in assigning content permissions (e.g., read/write) and/or channel rights (e.g., changing membership, adding tasks, scheduling meetings, etc.) to both internal and external members can be achieved.

In accordance with examples of the present disclosure, invitees may be invited to join the shared collaborative channel. The invitees may be internal users (e.g., users inside of a resource tenant where the shared collaborative channel is hosted) or external users (e.g., users outside of the resource tenant). For example, a common channel invitation may be generated for the external users. The common channel invitation may include an invitation link that allows external users to be treated as channel members (e.g., provisional members) with specific permissions to access content of the shared collaborative channel while the common channel invitation is unredeemed (or not yet accepted) for the full user experience. This allows the external users to interact with members and some content of the shared collaborative channel, thereby incentivizing the external users to redeem the common channel invitation to join the shared collaborative channel.

It should be appreciated that although, for exemplary purposes, described embodiments generally relate to applications, e.g., such as email applications, chat applications, collaborative platforms, and the like, the present methods and systems are not so limited. For example, collaboration content described herein may be used to provide collaborative experiences in applications other than messaging applications, such as word processing applications, spreadsheet applications, notebook applications, presentation applications, instant messaging or chat applications, social networking platforms, and the like.

Referring now to FIG. 1, an exemplary collaborative communication system 100 for facilitating collaborations between users is provided, in accordance with an embodiment of the present disclosure. To do so, the collaborative communication system 100 includes a collaborative platform server 110 that is communicatively coupled to a plurality of computing devices 130 associated with users (e.g., members) 120 in via a network 160. The network 160 may include any kind of computing network including, without limitation, a wired or wireless local area network (LAN), a wired or wireless wide area network (WAN), and/or the Internet.

Specifically, FIG. 1 illustrates an overview of an example collaborative communication system 100 through which a member of a collaboration team 136 in an organization may collaborate with another member within or outside of the collaboration team 136 in the same or different organization via a collaborative platform server 110. The collaborative platform server 110 is associated with a collaborative platform, such as Microsoft Teams. In the illustrative aspect, the collaborative platform server 110 includes a channel manager 114. The channel manger 114 may manage memberships and access permissions of one or more shared collaborative channels 138.

Additionally, the channel manger 114 may invite external users (e.g., users outside of a resource tenant where the shared collaborative channel is hosted) to a shared collaborative channel 138. To do so, the channel manger 114 generates a common channel invitation for the external users with an invitation link that enables the external users to access at least some aspects of the shared collaborative channel as provisional members. As an example, when a member of a shared collaborative channel 138 initiates a request to create a common channel invitation to the shared collaborative channel 138, the request is sent to a middle tier service associated with the collaborative platform server 110 (e.g., Teams® middle tier service) to create an invitation link. Subsequently, an invitation token is created by group service for a channel group (e.g., channel group 406) associated with the shared collaborative channel 138. In aspects, the invitation token may grant one or more limited permissions to the shared collaboration channel 138. The middle tier service stores a mapping of the invitation link and the invitation token and returns the invitation link for sharing with one or more invitees. It should be appreciated that the one or more invitees may be internal or external users to the shared collaborative channel 138. When an invitee of the one or more invitees clicks the invitation link, the middle tier service fetches the invitation token based on the mapping of the invitation link (e.g., an invite URL) and the invite token stored by the middle tier service based on the common channel invitation. At this point, the invitee is not yet a member of the shared collaborative channel 138, but the invitee is granted the one or more limited permissions to interact with the shared collaborative channel based on the invitation token (e.g., access to content like group chat or a membership list of the shared collaborative channel). It should be appreciated that the limited set of permissions may be defined by the collaborative platform server 110. For example, the invitee may have read-only or read-write access to chat information or read-only access to a membership roster prior to becoming a full-fledged member of the shared collaborative channel (e.g., via a full invite redemption process). Once the channel invitation is accepted, additional permissions may be granted (e.g., read-write access to a shared calendar) based on membership to the shared collaborative channel (e.g., by adding the invitee as a member to the channel group associated with the shared collaborative channel).

The external users have an option to redeem the common channel invitation to join as confirmed members the shared collaborative channel. In the illustrative aspect, the invitation link is generated such that an external user who accesses the shared collaborative channel via the invitation link is granted a limited set of permissions to interact with the shared collaborative channel (e.g., access at least some content of the shared collaborative channel, communicate with members of the shared collaborative channel, etc.) while the invitation is unredeemed. In other words, the external user is treated as a provisional member with limited permissions while the invitation is unredeemed. This may allow the external user to experience the shared collaborative channel and incentivize the external user to redeem the common channel invitation to join the shared collaborative channel as a confirmed member, with the full set of permissions granted by the invitation for the particular external member (based on user identity and/or role, channel policies, organizational policies, and the like). It should be appreciated that, in some aspects, the external user may not be associated with a tenant. In some aspects, the external user may not even be registered on the collaborative platform where the shared collaborative channel is hosted. In some aspects, the request may include a general message for external users with a description of the shared collaborative channel and the benefits associated with joining.

Content 140 may be shared and/or updated by one or more members of the shared collaborative channel 138 via an application 132 that is communicatively coupled to the collaborative platform server 110. For example, the content may include documents, agenda items, calendar items, action or task items, notes, or the like. It should be appreciated that any content (e.g., materials, documents, data, etc.) discussed or shared during a collaboration session may be automatically associated with the respective collaborative channel 138 and commonly stored (e.g., a channel group database associated with the shared collaborative channel) that is accessible only by the members of the shared collaborative channel 138, based on any applicable permissions or rights to the content assigned to each member. In other words, the collaborative communication system 100 may provide a concurrent multi-user interaction and a real-time collaboration between the members of the shared collaborative channel 138—whether inside or outside of an organization.

As described above, each user 120 of the collaborative platform may customize the user's collaborative environment, which is displayable on a user interface 133 of the user device 130. It should be appreciated that each member of the shared collaborative channel 138 may choose where to link or mount the shared collaborative channel 138 within the user's collaborative environment. However, it should be appreciated that, in some aspects, the shared collaborative channel 138 may not be linked to a collaboration team 136 but instead linked to the user's collaborative environment as a standalone channel.

Figure 2:
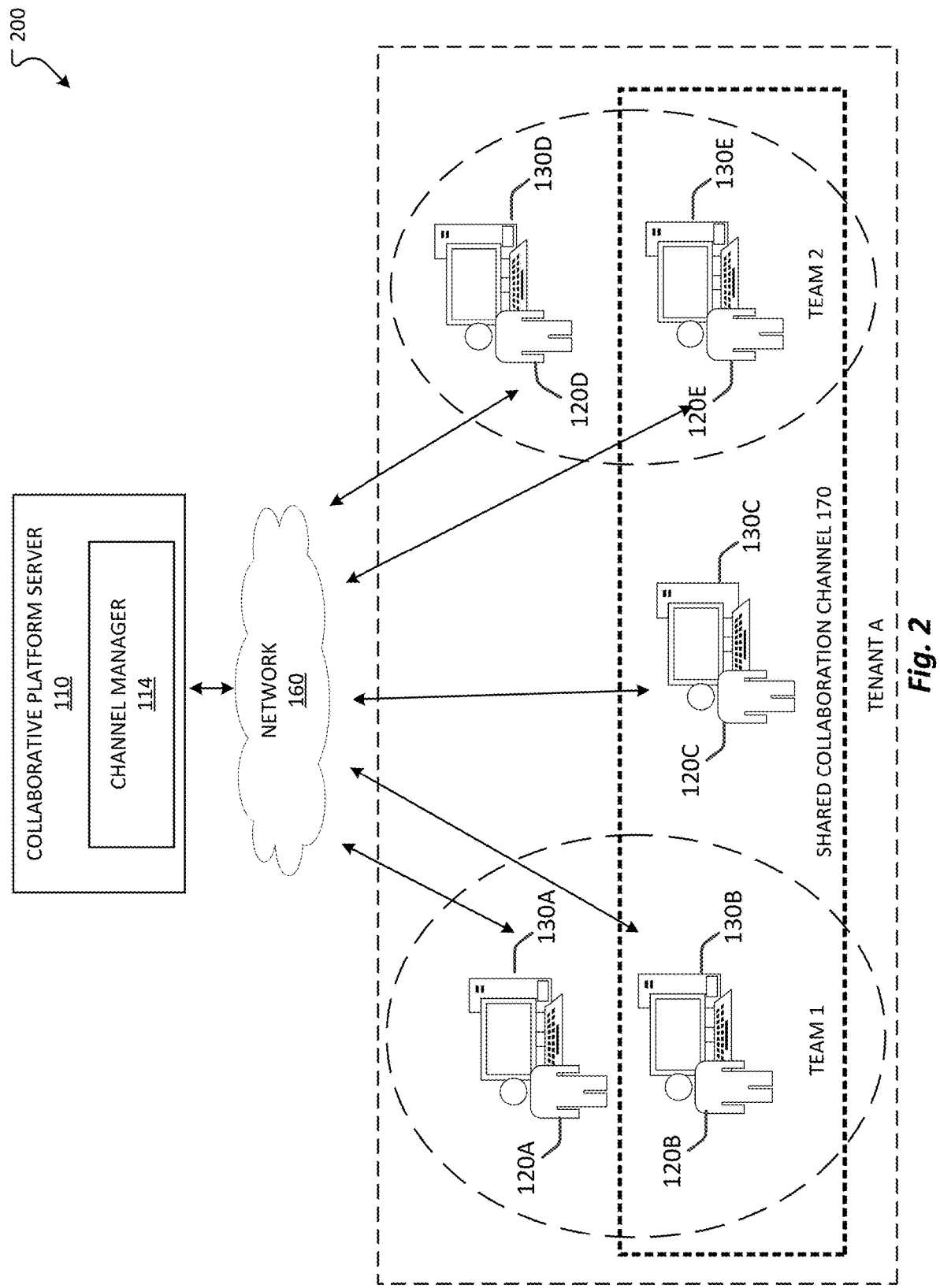
FIG. 2 depicts details directed to a collaborative communication system for facilitating collaborations between collaboration teams within an organization in accordance with examples of the present disclosure.
Figure 3:
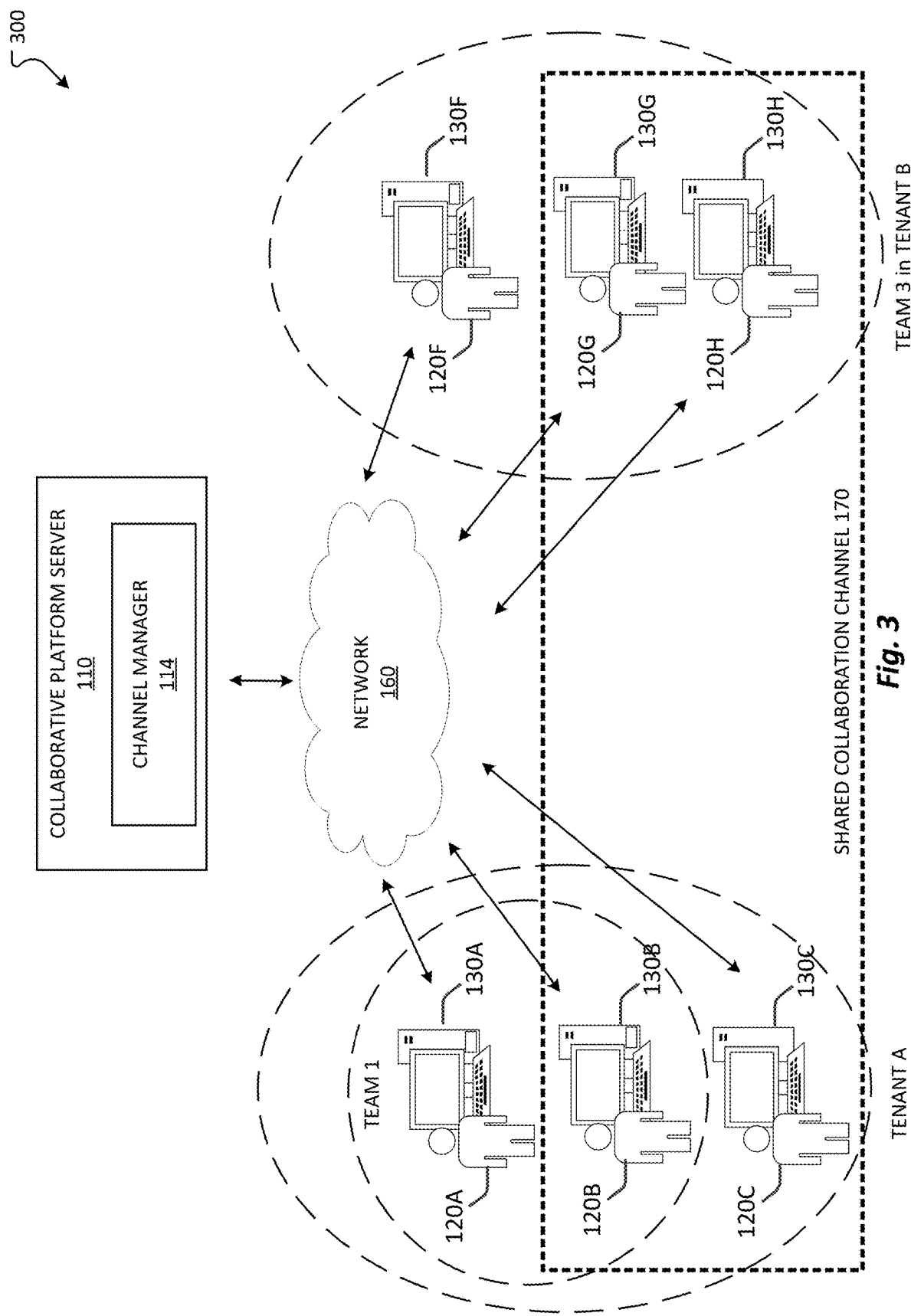
FIG. 3 depicts details directed to a collaborative communication system for facilitating collaborations between individuals and/or teams in different organizations in accordance with examples of the present disclosure.

Referring now to FIGS. 2 and 3, an exemplary shared collaborative channel is illustrated. Specifically, FIG. 2 depicts an exemplary collaborative communication system 200 for facilitating collaborations between different collaboration teams within the same organization, in accordance with an embodiment of the present disclosure. In the illustrative aspect, the collaborative communication system 200 allows a member of one collaboration team in an organization to create a shared collaborative channel 170 on a collaborative platform with other individuals and/or collaboration teams within the same organization. To do so, the collaborative communication system 200 includes a collaborative platform server 110 that is communicatively coupled to a plurality of computing devices 130A-130E associated with users (e.g., members) 120A-120E in the same organization, Tenant A, via the network 160. As described above, the network 160 may include any kind of computing network including, without limitation, a wired or wireless local area network (LAN), a wired or wireless wide area network (WAN), and/or the Internet.

As shown in FIG. 2, Collaboration Team 1 has two team members 120A, 120B. Each team member 120A, 120B has a computing device 130A, 130B that is communicatively coupled to the collaborative platform server 110 to achieve collaboration within Collaboration Team 1. Additionally, Collaboration Team 1 may have more than one collaborative channel shared among the team members 120A, 120B. For example, the team member 120A (also referred to as a host or an originating channel owner from an originating collaboration team) may create a shared collaborative channel to initiate cross-team collaboration with Collaboration Team 2 in the same organization, Tenant A. When the shared collaborative channel is created, the membership of the shared collaborative channel may be defined as an aggregation of members from Collaboration Team 1 (e.g., the originating collaboration team) and Collaboration Team 2 (e.g., a recipient collaboration team). Additionally, the originating channel owner 120A may also invite a member 120C of Tenant A, who is not a member of any collaborative channel, to the shared collaborative channel.

Alternatively, or additionally, as depicted in FIG. 3, an exemplary collaborative communication system 300 may facilitating collaboration between collaboration teams across different organizations (e.g., cross-tenants), in accordance with an embodiment of the present disclosure. Specifically, in the illustrative aspect, the collaborative communication system 300 allows a member of one organization (whether a member of a collaboration team within the organization or not) to create a shared collaborative channel with other individuals and/or collaboration teams from another organization. To do so, the collaborative communication system 300 includes a collaborative platform server 110 that is communicatively coupled to a plurality of computing devices 130A-130C associated with members 120A-120C in Tenant A and a plurality of computing devices 130F-130H associated with members 120F-120H in Tenant B via the network 160.

As shown in FIG. 3, Collaboration Team 1 has three team members 120A, 120B. Each team member has a computing device 130A, 130B that is communicatively coupled to the collaborative platform server 110 to achieve collaboration within Collaboration Team 1. Additionally, Collaboration Team 1 may have more than one collaborative channel shared among the team members 120A, 120B. For example, the team member 120A (also referred to as a host or an originating channel owner from an originating collaboration team) may create a shared collaborative channel to initiate cross-team collaboration with Collaboration Team 3 from a different organization, Tenant B. When the shared collaborative channel is created, the membership of the shared collaborative channel may be defined as an aggregation of members from Collaboration Team 1 (e.g., the originating collaboration team) and Collaboration Team 3 (e.g., a recipient collaboration team). Additionally, the originating channel owner 120A may also invite a member 120C of Tenant A, who is not a member of any collaborative channel, to the shared collaborative channel.

Referring now to FIGS. 4A and 4B, example user interfaces of computing devices when a shared collaborative channel is shared between an originating team (e.g., "Product" Team) and a recipient team (e.g., "Marketing" Team) in accordance with examples of the present disclosure. In the illustrative aspect, when an invitation to a shared collaborative channel is sent to an external collaboration team, the external designated owner of the external collaboration team may only define or modify the scope of the shared collaborative channel for the external collaboration team but not for the members of the internal collaboration team. For example, as illustrated in FIG. 4A, the external designated owner may grant all team members of the external collaboration team access to the shared collaborative channel, in which case, all team members of the external collaboration team are aggregated and added to the channel membership of the shared collaborative channel. In other words, all team members of the external collaboration team can see the shared collaborative channel and can access content of the shared collaborative channel. Alternatively, the external designated owner may select a subset of members from the external collaboration team to be included in the shared collaborative channel, as illustrated in FIG. 4B. In such a case, only the selected team members can see the shared collaborative channel and can access content of the shared collaborative channel.

Figure 4C:
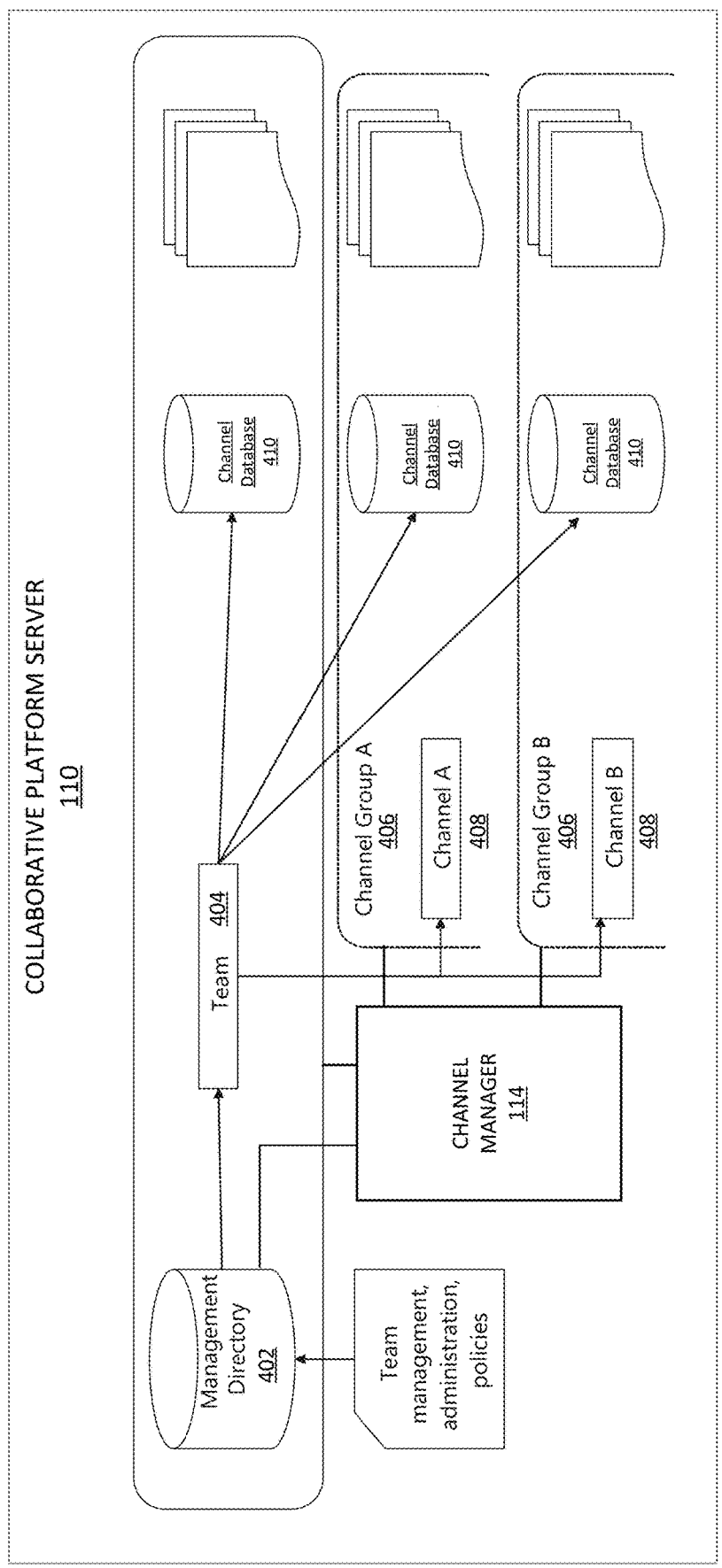
FIG. 4C depicts an exemplary block diagram of a collaborative platform server in accordance with examples of the present disclosure.

Referring now to FIG. 4C, an illustrative block diagram of the collaborative platform server 110 in accordance with examples of the present disclosure is provided. Upon receiving a request to generate a new private or shared collaborative channel, the collaborative platform server 110 provisions a channel group 406 associated with the new collaborative channel 408. As described above, each channel group 406 has its own channel database 410 for storing content (e.g., membership, messages, calendar entries) that are shared between members of the associated collaborative channel. This allows the channel-only members to only access content in the respective group database and prevents them from accessing all content of a collaboration team outside of the shared collaborative channel. It should be appreciated that a management directory 402 (e.g., Azure® Active Directory®) may receive and store various data associated with the collaboration team 404, including rules or policies (e.g., authentication and access) related to team management and/or administration. It should be appreciated that this information may be synced down to one or more channel databases 410.

The channel manager 114 is communicatively coupled to one or more channel groups, each of which is associated with a shared collaborative channel. The channel manager 114 is configured receive a request from a member of a shared collaborative channel to invite a particular user to the shared collaborative channel and generate a specific channel invitation associated with the particular user. In other words, the specific channel invitation is only accessible and redeemable by the particular user. Additionally, the channel manager 114 is further configured to generate a common channel invitation that is not tied to a particular user and may be redeemed by individuals (e.g., invitees) who receive the common channel invitation. As described further below, the common channel invitation may include an invitation link that allows external users to access content of the shared collaborative channel as provisional members prior to joining (e.g., prior to accepting the common channel invitation) as confirmed members of the shared collaborative channel. In illustrative aspect, when the external users access the invitation link, the external users are provisionally added to the channel group associated with the shared collaborative channel based upon the invitation itself. In this way, the external users (e.g., provisional members of the shared collaborative channel) may have at least some access to corresponding content before accepting the invitation and becoming a confirmed member of the shared collaborative channel. In some cases, at least partial access to the corresponding content of the shared collaborative channel may incentivize an acceptance of the channel invitation (e.g., increasing the likelihood of redeeming the common channel invitation to join the shared collaborative channel) by the external users.

Figure 5:
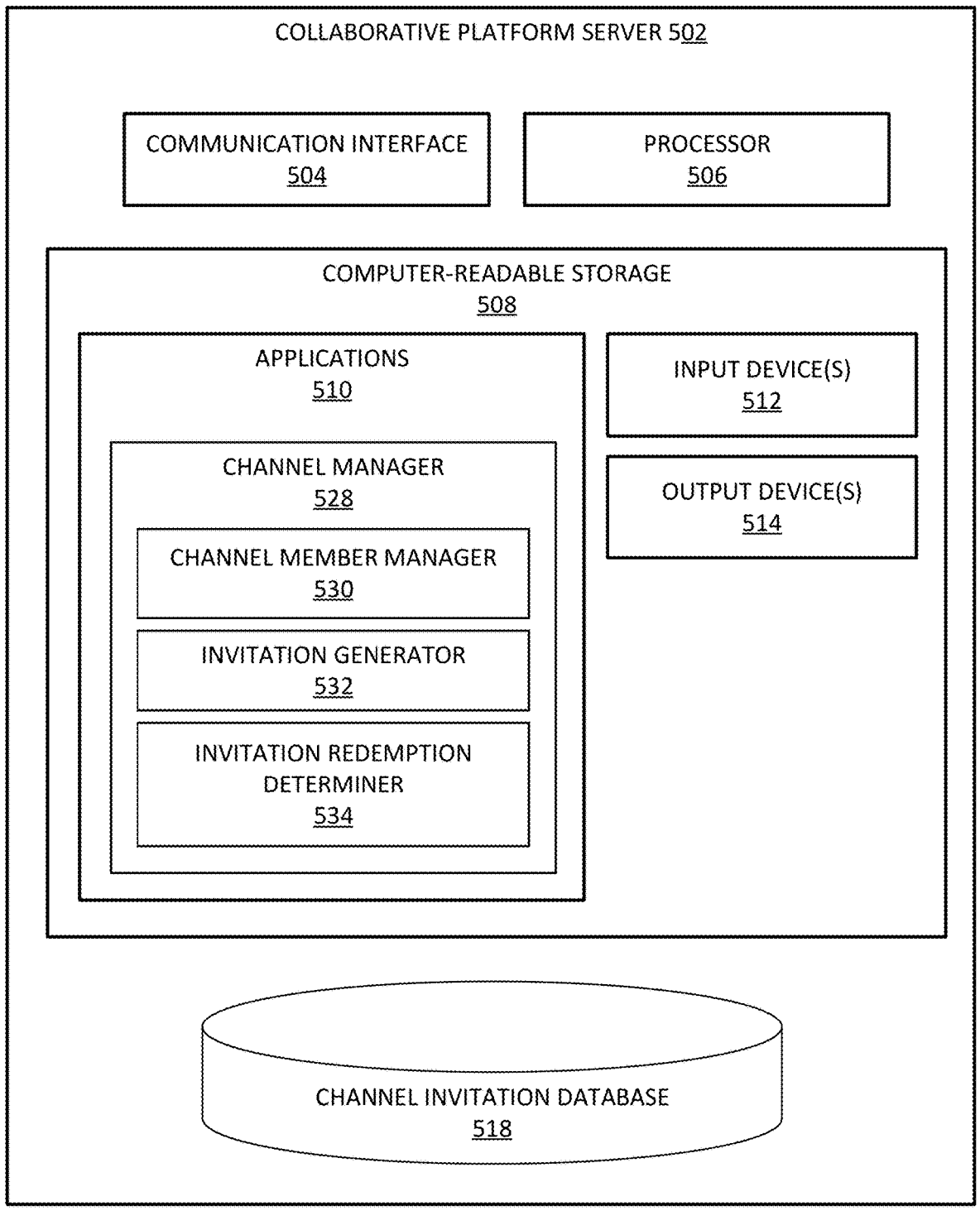
FIG. 5 depicts a block diagram illustrating physical components (e.g., hardware) of a collaborative platform server with which aspects of the disclosure may be practiced.

Referring now to FIG. 5, the collaborative platform server 502 in accordance with examples of the present disclosure is provided. The collaborative platform server 502 may be the same as or similar to the collaborative platform server 110 previously described in FIGS. 1-3. The collaborative platform server 502 may include a communication interface 504, a processor 506, a computer-readable storage 508, one or more input devices 512, and one or more output devices 514. In examples, the communication interface 504 may be coupled to a network and receive a request to generate a collaborative channel. Additionally, one or more applications 510 may be provided by the collaborative platform server 502. The one or more applications 510 may include a channel manager 528. The channel manager 528 may be the same as or similar to the channel manager 114 previously described in FIGS. 1-3.

The channel manager 528 is configured to manage memberships and access permissions of a shared collaborative channel. To do so, the channel manager 528 may further include a channel member manager 530, an invitation generator 532, and an invitation redemption determiner 534. The channel member manager 530 is configured to manage membership of each shared collaborative channel. For example, the channel member manager 530 may receive a request from a member of a shared collaborative channel in a resource tenant to invite a particular user to join the shared collaborative channel. Such a request may include user information. Alternatively, the channel member manager 530 may receive a request to generate a common channel invitation that may be redeemed by one or more external users who receive the common channel invitation to join a shared collaborative channel. As described above, the external users are users outside of a resource tenant where the shared collaborative channel is hosted. It should be appreciated that, in some aspects, the external users may not be associated with a tenant. In some aspects, the external users may not even be registered on the collaborative platform where the shared collaborative channel is hosted. In some aspects, the request may include a message with a description of the shared collaborative channel, which may be included in the channel invitation. The channel member manager 530 is configured to communicate with the invitation generator 532 to generate different types of channel invitations (e.g., specific and/or general) to the shared collaborative channel.

The invitation generator 532 is configured to generate a common channel invitation for one or more invitees (including internal and/or external users) with an invitation link that takes the invitees to the shared collaborative channel where the invitees have an option to redeem the common channel invitation to join the shared collaborative channel (e.g., become a confirmed member of the shared collaborative channel). To do so, the invitation generator 532 generates the invitation link, such that an invitee who accesses the shared collaborative channel via the invitation link is granted a limited set of permissions to interact with the shared collaborative channel (e.g., access at least some content of the shared collaborative channel, communicate with members of the shared collaborative channel, etc.) while the invitation is unredeemed. The channel invitation may further include a message with a description of the shared collaborative channel and/or an expiration indication for the common channel invitation (e.g., 7 days after the invitee first accesses the shared collaborative channel via the invitation link). It should be appreciated that the common channel invitation may be stored in a channel invitation database 518, which may be used to keep track of pending channel invitations. Additionally, the channel invitation database 518 may further include a mapping of the invitation link and an invitation token generated by a channel group (e.g., 406) associated with the shared collaborative channel 138. As described further below, when the invitation link is accessed by an invitee, the invitation token is fetched to determine one or more limited permissions that are granted to the invitee while the channel invitation is unredeemed. It should be appreciated that the invitation generator 532 may be embodied as a middle tier service associated with the collaborative platform server 110.

The invitation redemption determiner 534 is configured to determine whether one or more invitees have redeemed the channel invitation and/or accessed the shared collaborative channel via the invitation link. The invitation redemption determiner 534 is further configured to periodically or continually determine if the channel invitation is valid (e.g., not expired). For example, the common channel invitation may expire 7 days after an invitee first accesses the shared collaborative channel via the invitation link. If the channel invitation is invalid (e.g., expired), the invitation redemption determiner 534 may inactivate the channel invitation and terminate the invitees' limited access to the shared collaborative channel. If the invitation redemption determiner 534 determines that the channel invitation has been redeemed by the one or more invitees, the invitation redemption determiner 534 notifies the channel member manager 530 to add the one or more invitees to the shared collaborative channel (e.g., as confirmed members of the shared collaborative channel).

Figure 6A:
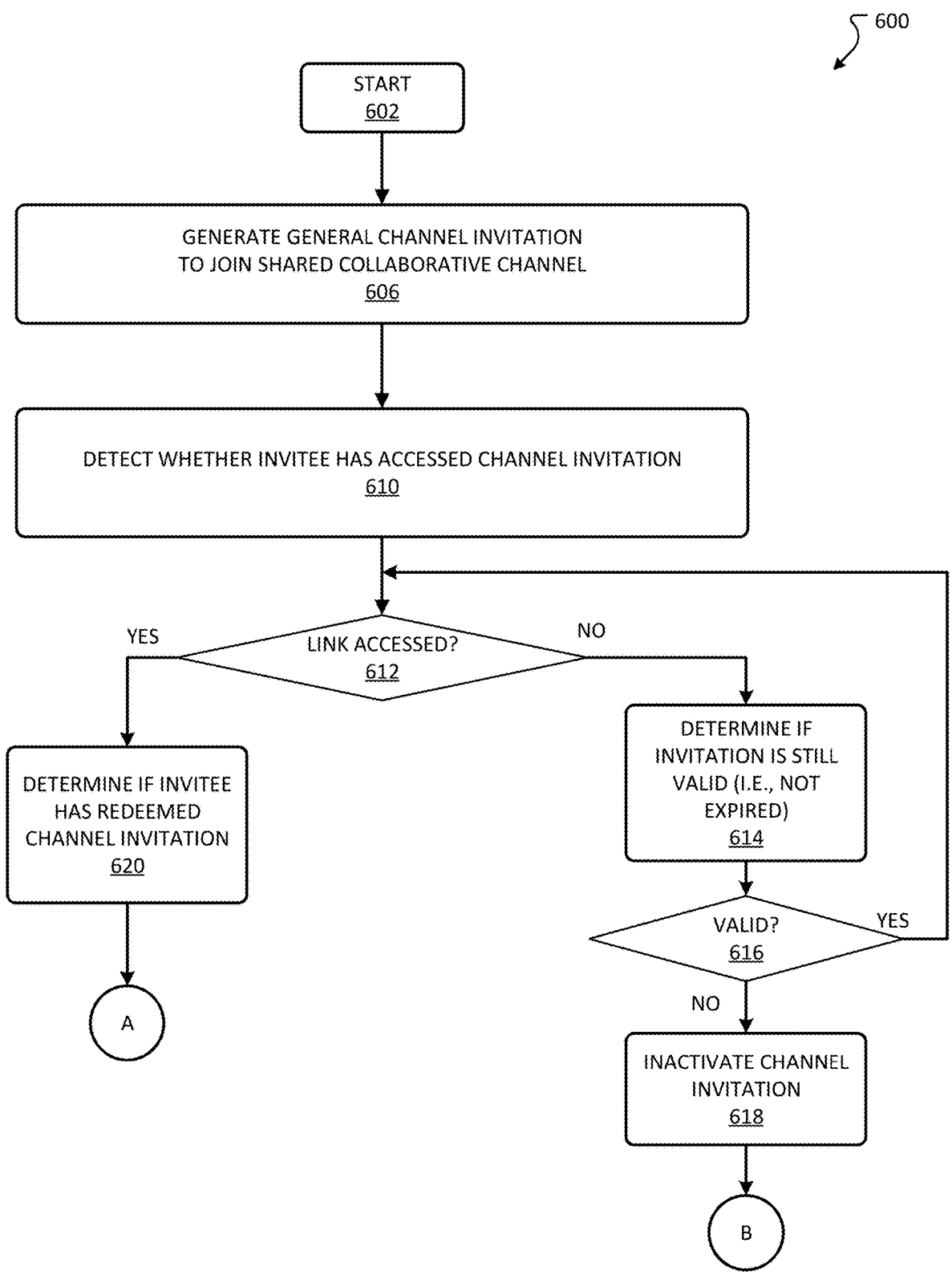
FIGS. 6A and 6B depict a method directed to inviting an external user to join a shared collaborative channel in accordance with examples of the present disclosure.
Figure 6B:
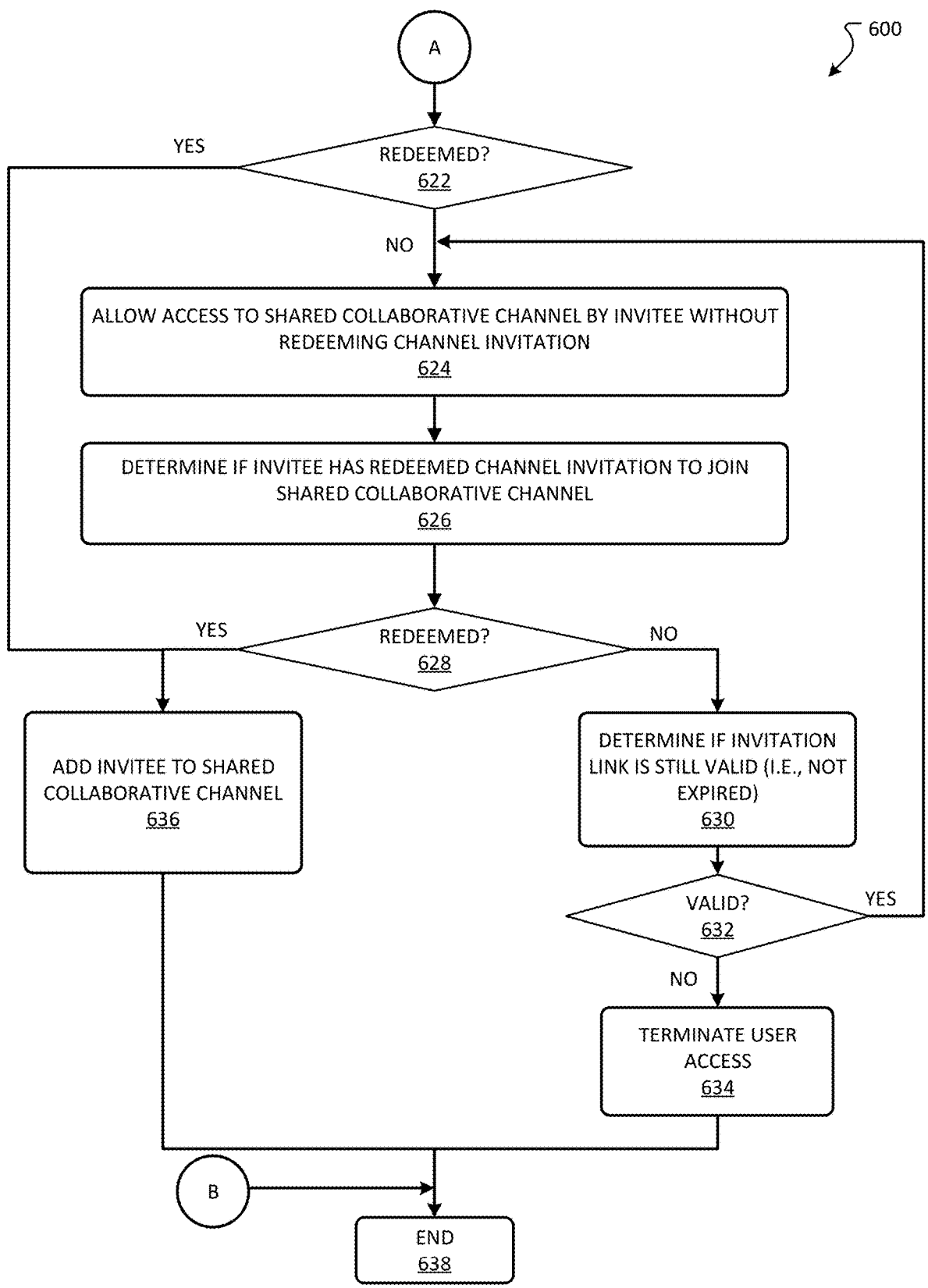

Referring now to FIG. 6, a method 600 for creating a shared collaborative channel in accordance with examples of the present disclosure is provided. A general order for the steps of the method 600 is shown in FIG. 6. Generally, the method 600 starts at 602 and ends at 638. The method 600 may include more or fewer steps or may arrange the order of the steps differently than those shown in FIG. 6. In the illustrative aspect, the method 600 is performed by a collaborative platform server (e.g., a collaborative platform server 110, 800). For example, the collaborative platform server may be, but is not limited to, a web-server, a server instance on a cloud platform, a cloud-enabled operating system, or any other suitable computing device that is capable of communicating with one or more computing devices (e.g., a computing device 130) associated with one or more members (e.g., 120) of one or more organizations. For example, the collaborative platform server may be any suitable computing device that is capable of communicating with the computing device. As described above, in some aspects, the collaborative platform server may be a group of servers that are communicatively coupled to one another. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIG. 1.

The method 600 starts at 602, where flow may proceed to 606. At 606, the collaborative platform server generates a common channel invitation associated with a shared collaborative channel that may be redeemed by one or more invitees (e.g., external users outside of the resource tenant to join the shared collaborative channel). For example, the common channel invitation may include an invitation link that takes the invitees to the shared collaborative channel, where the invitees have an option to redeem the invitation and join the shared collaborative channel (e.g., become confirmed members of the shared collaborative channel). To do so, the collaborative platform server generates the invitation link that allows invitees to be treated as provisional members with a limited set of permissions to access at least some content of the shared collaborative channel while the common channel invitation remains unredeemed. The common channel invitation may further include a message with a description of the shared collaborative channel and/or an expiration indication for the channel invitation. In some aspects, the common channel invitation may be sent to invitees via text messages, emails, group messages, and/or social media posts.

Subsequently, at 610, the collaborative platform server detects whether an invitee has accessed the shared collaborative channel via the invitation link. If the collaborative platform server detects an invitee has not accessed to the shared collaborative channel, the method 600 proceeds to operation 614 to determine if the common channel invitation is still valid. If the collaborative platform server detects that the invitee has accessed the invitation link to the shared collaborative channel, the method 600 skips ahead to operation 620, where the collaborative platform server further determines if the invitee has redeemed the common channel invitation. Subsequently, the method 600 proceeds to operation 622 in FIG. 6B as shown by the alphanumeric character A in FIGS. 6A and 6B.

At operation 614, the collaborative platform server may determine whether the common channel invitation is still valid. For example, as described above, the common channel invitation may expire after a predetermined time period (e.g., 1 week). If the common channel invitation is determined to be valid in operation 616, the method 600 loops back to operation 612 to continue determining whether the invitation link has been accessed. If, however, the common channel invitation is determined to be invalid, the method 600 proceeds to operation 618 to inactivate the common channel invitation, such that the common channel invitation is no longer redeemable. Subsequently, the method 600 may skips ahead to end at 638 in FIG. 6B as shown by the alphanumeric character B in FIGS. 6A and 6B.

At operation 622, the collaborative platform server may determine whether the common channel invitation has been redeemed by the invitee that accessed the invitation link. If the collaborative platform server determines that the common channel invitation has been redeemed in operation 622, the method 600 skips ahead to operation 630. Subsequently, the method 600 may end at 638. If, however, the collaborative platform server determines that the common channel invitation has not been redeemed in operation 622, the method 600 advances to operation 624.

In operation 624, the collaborative platform server allows the invitee to access at least some content or resources of the shared collaborative channel while the common channel invitation is unredeemed for user experience. It should be appreciated that such access may be limited. For example, the limited access to the shared collaborative channel may allow the invitee to view chat threads, group messages, channel conversations, and/or one or more documents (e.g., photos and videos). As discussed above, the limited access to the shared collaborative channel may allow the one or more invitees (e.g., one or more users who are accessing the shared collaborative channel via the invitation link) to interact with members and some content of the shared collaborative channel, thereby incentivizing the one or more invitees to redeem the common channel invitation to join the shared collaborative channel.

As an example, when a member of a shared collaborative channel initiates a request to create a common channel invitation to the shared collaborative channel, the request is sent to a middle tier associated with the collaborative platform server (e.g., Teams® middle tier service) to create an invitation link. Subsequently, an invitation token is created by a group service for a channel group (e.g., channel group 406) associated with the shared collaborative channel. In aspects, the invitation token may be associated with one or more limited permissions for accessing the shared collaborative channel. The middle tier service stores a mapping of the invitation link and the invitation token and returns the invitation link for sharing with one or more invitees. It should be appreciated that the one or more invitees may be internal or external users to the shared collaborative channel. When an invitee of the one or more invitees clicks the invitation link, the middle tier service fetches the invitation token based on the mapping. At this point, the invitee is not yet a member of the shared collaborative channel, but the invitee is granted the one or more limited permissions to interact with the shared collaborative channel based on the invitation token (e.g., access to content like group chat or a membership roster of the shared collaborative channel). It should be appreciated that the one or more limited permissions may be defined by the collaborative platform server. For example, the invitee may have read-only or read-write access to chat information prior to becoming a full-fledged member of the shared collaborative channel (e.g., via a full invite redemption process). Once the common channel invitation is accepted, the invitee may be granted additional permissions based on full membership to the shared collaborative channel.

Subsequently, at operation 628, the collaborative platform server determines whether the invitee has redeemed the common channel invitation to join the shared collaborative channel as a confirmed member. If the collaborative platform server determines that the invitee still has not redeemed the common channel invitation in operation 628, the method 600 proceeds to operation 630. However, if the collaborative platform server determines that the invitee has redeemed the common channel invitation, the method 600 skips ahead to operation 636 to add the invitee to the shared collaborative channel and update the membership (e.g., a roster) of the shared collaborative channel in a channel database, for instance. Subsequently, the method 600 may end at 638.

In operation 630, the collaborative platform server may again determine if the common channel invitation is still valid (e.g., not expired). If the common channel invitation is determined to be valid in operation 632, the method 600 loops back to operation 624 to continue allowing the invitee access to the shared collaborative channel. If, however, the common channel invitation is determined to be invalid, the method 600 proceeds to operation 634 to terminate the user access and inactivate the invitation, such that the invitee no longer has access to the shared collaborative channel and the common channel invitation is no longer redeemable. Subsequently, the method 600 may end at 638.

Figure 7:
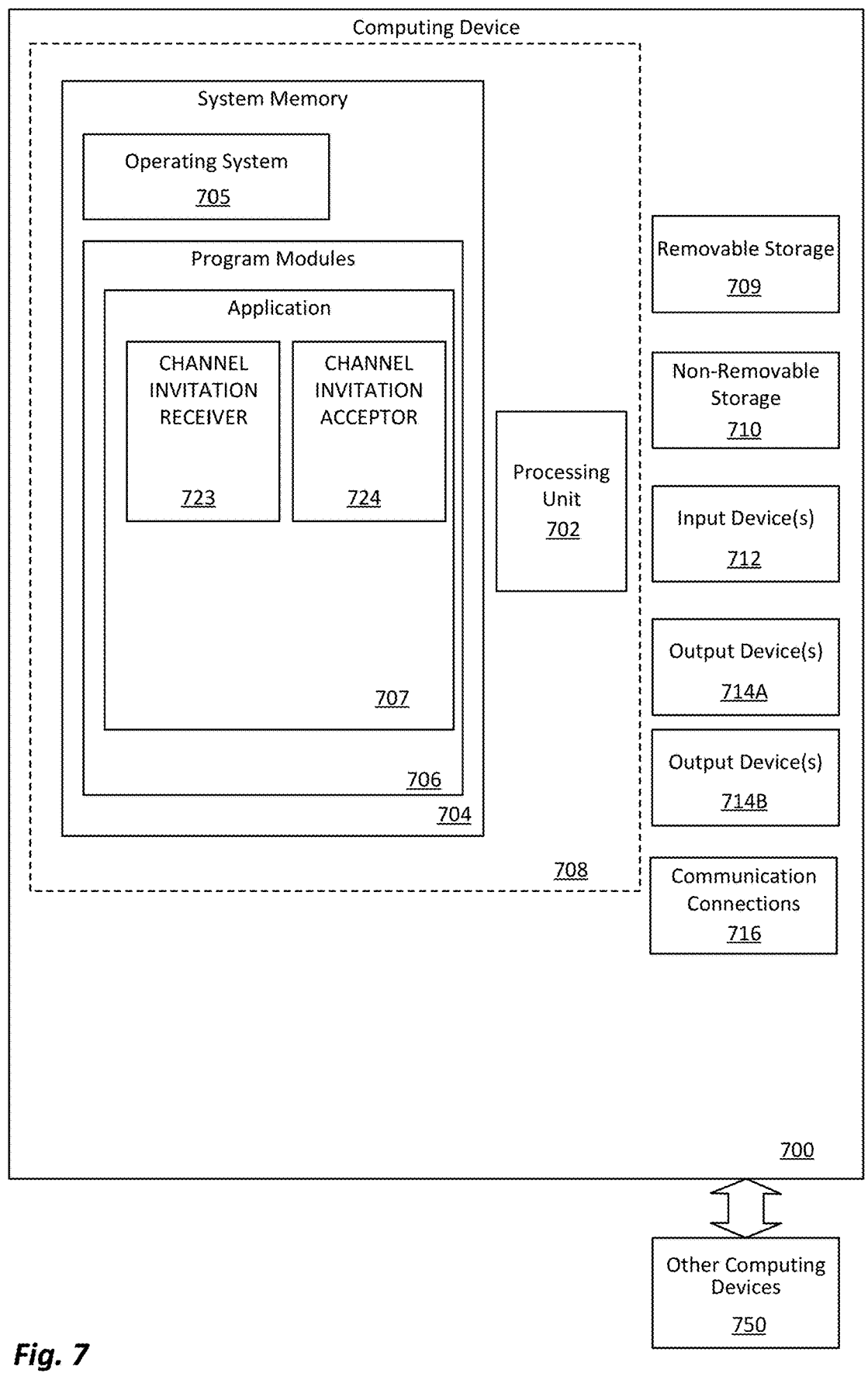
FIG. 7 depicts a block diagram illustrating physical components (e.g., hardware) of a computing device with which aspects of the disclosure may be practiced.
Figure 8A:
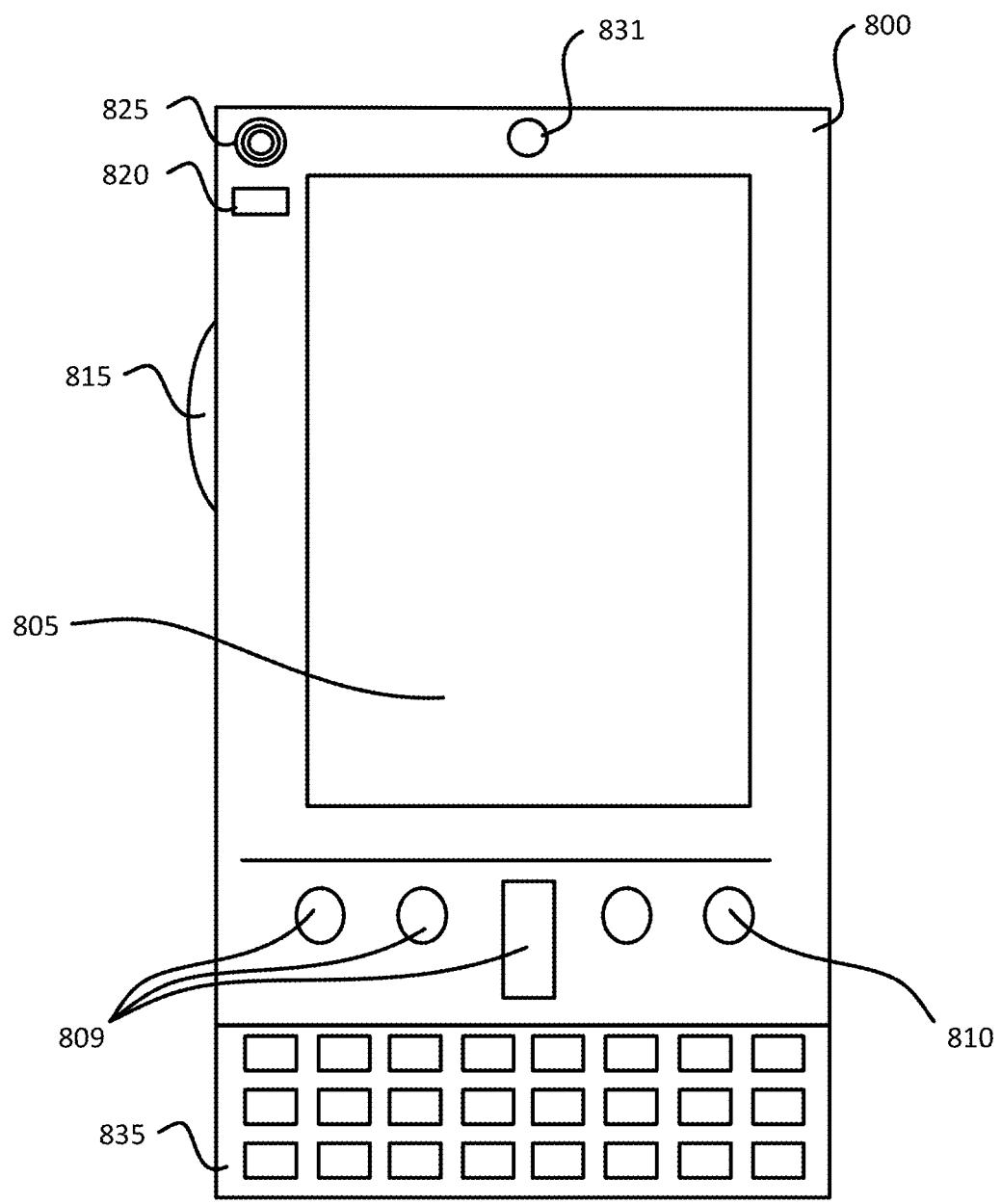
FIG. 8A illustrates a first example of a computing device with which aspects of the disclosure may be practiced.
Figure 8B:
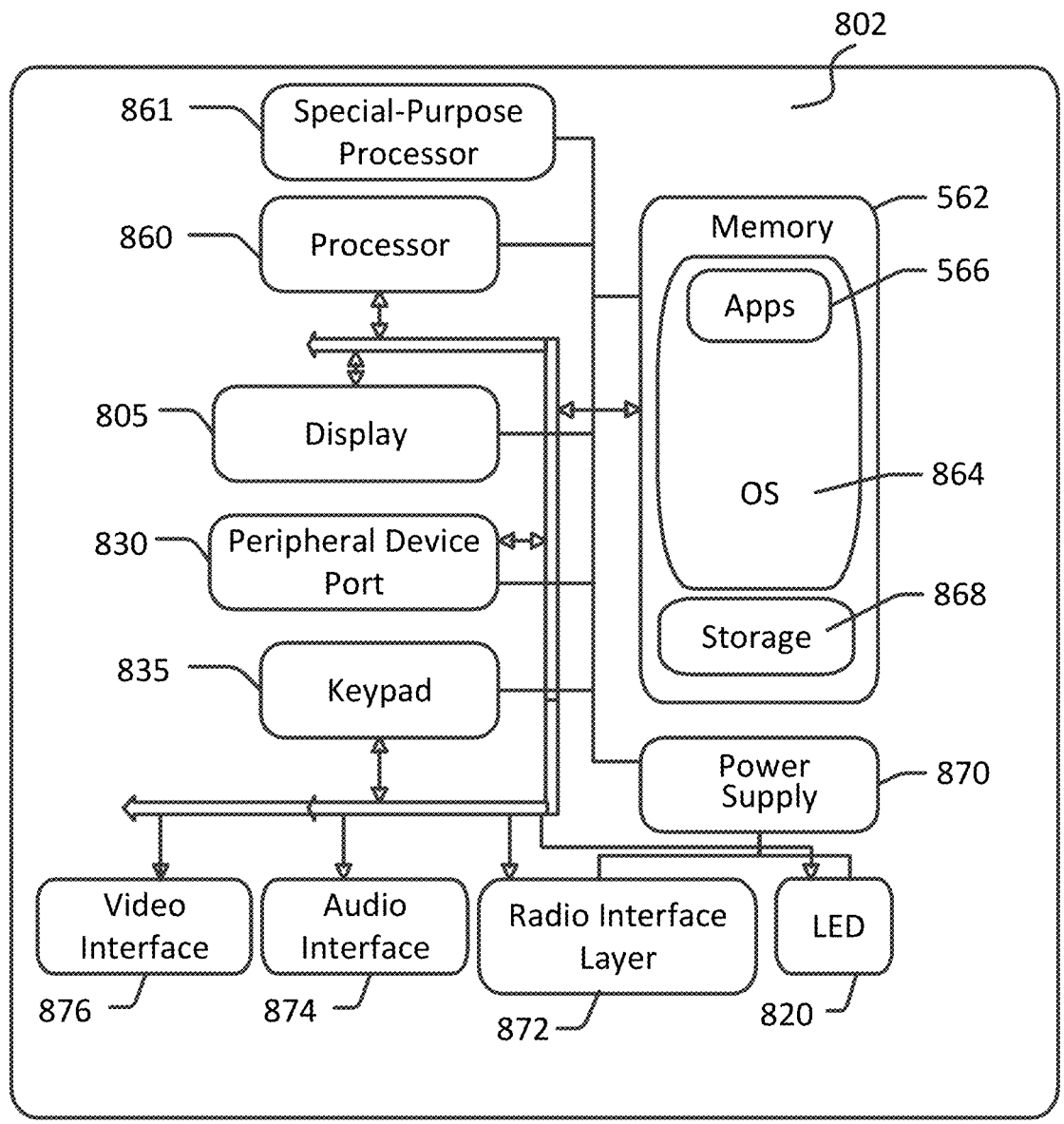
FIG. 8B illustrates a second example of a computing device with which aspects of the disclosure may be practiced.
Figure 9:
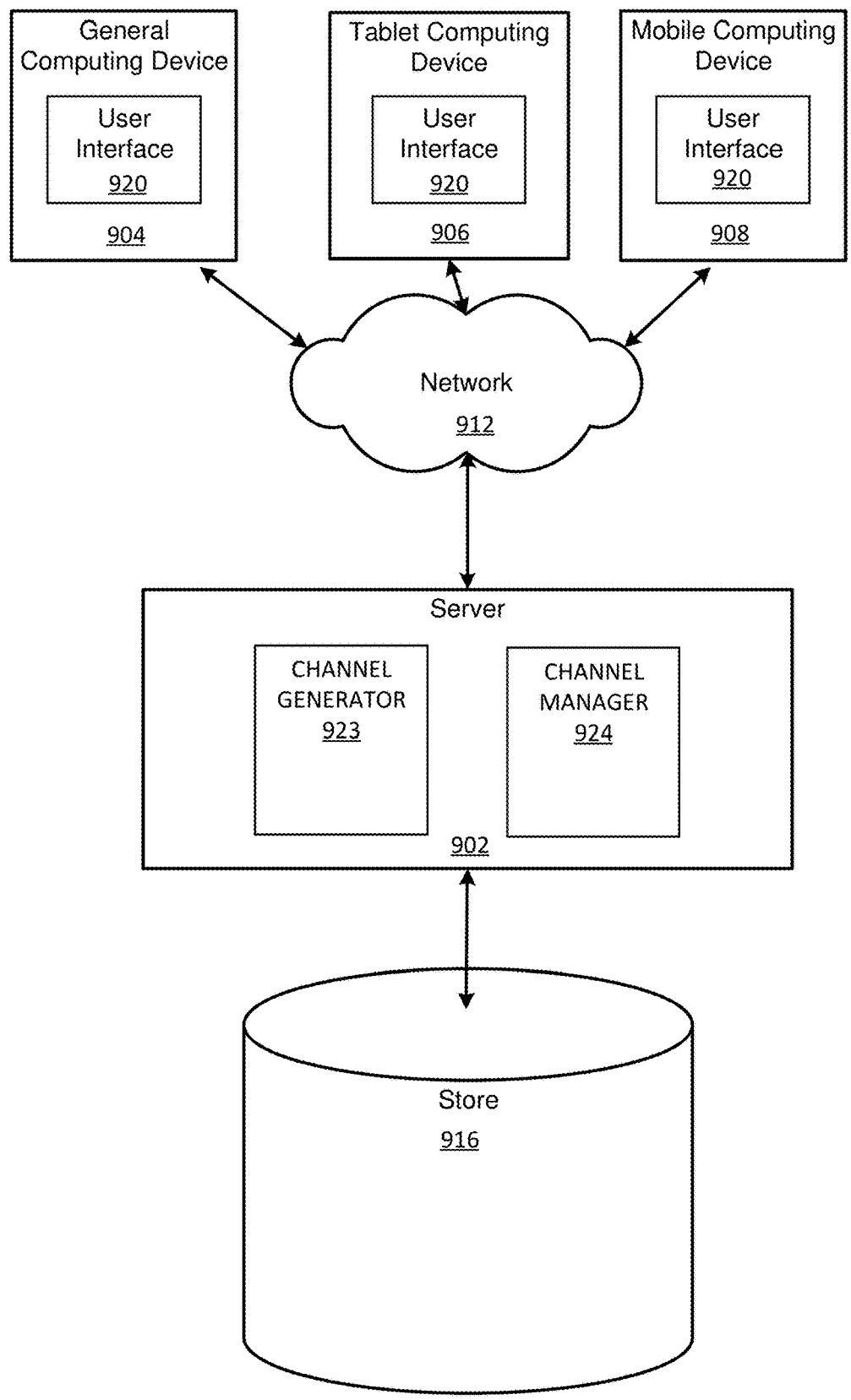
FIG. 9 illustrates at least one aspect of an architecture of a system for processing data in accordance with examples of the present disclosure.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above. For example, the computing device 700 may represent the computing device 130 of FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, several program modules and data files may be stored in the system memory 704. While executing on the at least one processing unit 702, the program modules 706 may perform processes including, but not limited to, one or more aspects, as described herein. The application 720 includes a channel invitation receiver 723 and a channel invitation acceptor 724. The channel invitation receiver 723 is configured to receive a channel link, and the channel link acceptor 724 is configured to accept the invitation.

Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714A such as a display, speakers, a printer, etc. may also be included. An output 714B, corresponding to a virtual display may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media (e.g., non-transitory media). Computer storage media may include non-transitory, volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 809/810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 831 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports 830, such as an audio input (e.g., a microphone jack), an audio output (e.g., a headphone jack), and a video output (e.g., a HDMI port) for sending signals to or receiving signals from an external source.

FIG. 8B is a block diagram illustrating the architecture of one aspect of computing device, a server, or a mobile computing device. That is, the mobile computing device 800 can incorporate a system (902) (e.g., an architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and/or one or more components supported by the systems described herein. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g. a channel invitation receiver 723 and a channel invitation acceptor 724, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860/961 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, the computing device 904, 906, 908 may represent the computing device 130 of FIGS. 1-3, and the server device 902 may represent the collaborative platform server 110 of FIG. 1.

In some aspects, one or more of a channel generator 923 and a channel manager 924, may be employed by server device 902. The server device 902 may provide data to and from a client computing device such as a personal computer 904, a tablet computing device 906 and/or a mobile computing device 908 (e.g., a smart phone) through a network

912. By way of example, the computer system described above may be embodied in a personal computer 904, a tablet computing device 906 and/or a mobile computing device 908 (e.g., a smart phone). Any of these aspects of the computing devices may obtain content from the store 916, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for inviting an external user to join a shared collaborative channel is provided. The method includes generating a common channel invitation for one or more users and causing the common channel invitation to be transmitted to the one or more users. The common channel invitation includes an invitation link to a shared collaborative channel and a selectable option to redeem the common channel invitation to the shared collaboration channel. The method further includes monitoring whether the one or more users access the shared collaborative channel via the invitation link. In response to detecting that at least one of the one or more users is accessing the shared collaborative channel via the invitation link, the method includes allowing the at least one user to view at least some content of the shared collaborative channel and determining whether the at least one user has redeemed the common channel invitation via the invitation link. In response to determining that the at least one user has redeemed the common channel invitation, the method includes adding the at least one user as a confirmed member to a roster of the shared collaborative channel.

In accordance with at least one aspect of the above method, the method may further include where the at least one member is an external user outside of a resource tenant hosting the shared collaborative channel.

In accordance with at least one aspect of the above method, the method may further include where the at least some content of the shared collaborative channel is less than all of the content of the shared collaborative channel.

In accordance with at least one aspect of the above method, the method may further include creating an invitation token, wherein the invitation token is associated with one or more permissions for accessing content of the shared collaborative channel, mapping the invitation token to the invitation link, and fetching the invitation token for allowing the at least one user to view at least some content of the shared collaborative channel.

In accordance with at least one aspect of the above method, the method may further include where the common channel invitation includes a limited set of permissions for accessing the shared collaborative channel via the invitation link, and wherein the limited set of permissions authorize the at least one user to access the at least some content of the shared collaborative channel as a provisional member of the shared collaborative channel.

In accordance with at least one aspect of the above method, the method may further include the common channel invitation includes a message with a description of the shared collaborative channel and an expiration indication for the common channel invitation.

In accordance with at least one aspect of the above method, the method may further include allowing the at least one user to view at least some content of the shared collaborative channel further comprises allowing the at least one user to view the at least some content of the shared collaborative channel until the common channel invitation is redeemed or expires.

In accordance with at least one example of the present disclosure, a computing device for inviting an external user to join a shared collaborative channel is provided. The computing device including a processor and a memory having a plurality of instructions stored thereon that, when executed by the processor, causes the computing device to perform operations. The operations include generating a common channel invitation for one or more users and providing the common channel invitation to the one or more users. The common channel invitation includes (1) an invitation link to a shared collaborative channel, (2) a selectable option to redeem the common channel invitation to the shared collaboration channel, and (3) a limited set of permissions for the at least one user who accesses the shared collaborative channel via the invitation link. The operations further include monitoring whether the one or more users access the shared collaborative channel via the invitation link, and in response to detection of at least one of the one or more users accessing the shared collaborative channel via the invitation link, allowing the at least one user to view at least some content of the shared collaborative channel. Additionally, the operations include determining whether the at least one user has redeemed the common channel invitation via the invitation link, and in response to determination that the at least one user has redeemed the common channel invitation, adding the at least one user as a confirmed member to a roster of the shared collaborative channel.

In accordance with at least one aspect of the above computing device, to allow the at least one user to view at least some content of the shared collaborative channel may comprise causing the computing device to allow the at least one user to view the at least some content of the shared collaborative channel until the common channel invitation is redeemed or expires.

In accordance with at least one aspect of the above computing device, the at least one member may be an external user outside of a resource tenant where the shared collaborative channel is hosted.

In accordance with at least one aspect of the above computing device, the at least some content of the shared collaborative channel may be less than all of the content of the shared collaborative channel.

In accordance with at least one aspect of the above computing device, the limited set of permissions may authorize the at least one user to access the at least some content of the shared collaborative channel as a provisional member of the shared collaborative channel.

In accordance with at least one aspect of the above computing device, the plurality of instructions stored thereon that, when executed by the processor, may further cause the computing device to provide the limited set of permissions prior to redeeming of the common channel invitation to the at least one user until the at least one user redeems the common channel invitation via the invitation link.

In accordance with at least one aspect of the above computing device, the common channel invitation may included a message with a description of the shared collaborative channel and an expiration indication for the common channel invitation.

In accordance with at least one example of the present disclosure, a non-transitory computer-readable medium storing instructions for inviting an external user to join a shared collaborative channel is provided. The instructions when executed by one or more processors of a computing device, cause the computing device to perform operations. The operations include generating a common channel invitation for one or more users and causing the common channel invitation to be transmitted to the one or more users. The common channel invitation includes an invitation link to a shared collaborative channel and a selectable option to redeem the common channel invitation to the shared collaboration channel. Additionally, the operations further include monitoring whether the one or more users access the shared collaborative channel via the invitation link, and in response to detection of at least one of the one or more users accessing the shared collaborative channel via the invitation link, allowing the at least one user to view at least some content of the shared collaborative channel. The operations further include determining whether the at least one user has redeemed the common channel invitation via the invitation link, and in response to determination that the at least one user has redeemed the common channel invitation, adding the at least one user as a confirmed member to a roster of the shared collaborative channel.

In accordance with at least one aspect of the above computer-readable medium, to allow the at least one user to view at least some content of the shared collaborative channel may comprise causing the computing device to allow the at least one user to view at least some content of the shared collaborative channel until the common channel invitation is redeemed or expires.

In accordance with at least one aspect of the above computer-readable medium, the at least one member may be an external user outside of a resource tenant where the shared collaborative channel is hosted.

In accordance with at least one aspect of the above computer-readable medium, the at least some content of the shared collaborative channel may be less than all of the content of the shared collaborative channel.

In accordance with at least one aspect of the above computer-readable medium, the common channel invitation may include a limited set of permissions for the at least one user who accesses the shared collaborative channel via the invitation link, and wherein the limited set of permissions authorize the at least one user to access the at least some content of the shared collaborative channel as a provisional member of the shared collaborative channel.

In accordance with at least one aspect of the above computer-readable medium, the common channel invitation may include a message with a description of the shared collaborative channel and an expiration indication for the common channel invitation.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for inviting an external user to join a shared collaborative channel, the method comprising:
generating a common channel invitation for one or more users, wherein the common channel invitation includes an invitation link to a shared collaborative channel, a selectable option to redeem the common channel invitation to the shared collaboration channel, and a message with a description of the shared collaborative channel and an expiration indication for the common channel invitation;
causing the common channel invitation to be transmitted to the one or more users;
monitoring whether the one or more users access the shared collaborative channel via the invitation link;
in response to detecting that at least one of the one or more users is accessing the shared collaborative channel via the invitation link, allowing the at least one user to view at least some content of the shared collaborative channel until the common channel invitation expires;
determining whether the at least one user has redeemed the common channel invitation via the invitation link; and
in response to determining that the at least one user has redeemed the common channel invitation, adding the at least one user as a confirmed member to a roster of the shared collaborative channel.

2. The method of claim 1, wherein the at least one member is an external user outside of a resource tenant hosting the shared collaborative channel.

3. The method of claim 1, wherein the at least some content of the shared collaborative channel is less than all of the content of the shared collaborative channel.

4. The method of claim 1, further comprising:
creating an invitation token, wherein the invitation token is associated with one or more permissions for accessing content of the shared collaborative channel;
mapping the invitation token to the invitation link; and
fetching the invitation token for allowing the at least one user to view at least some content of the shared collaborative channel.

5. The method of claim 1, wherein the common channel invitation is associated with a limited set of permissions for accessing the shared collaborative channel via the invitation link, and wherein the limited set of permissions authorize the at least one user to access the at least some content of the shared collaborative channel as a provisional member of the shared collaborative channel.

6. The method of claim 1, wherein allowing the at least one user to view at least some content of the shared collaborative channel further comprises allowing the at least one user to view the at least some content of the shared collaborative channel until the common channel invitation expires.

7. A computing device for inviting an external user to join a shared collaborative channel, the computing device comprising:
  a processor; and
  a memory having a plurality of instructions stored thereon that, when executed by the processor, causes the computing device to:
    generate a common channel invitation for one or more users, wherein the common channel invitation includes (1) an invitation link to a shared collaborative channel, (2) a selectable option to redeem the common channel invitation to the shared collaboration channel, (3) a limited set of permissions for accessing the shared collaborative channel associated with the invitation link, and (4) a message with a description of the shared collaborative channel and an expiration indication for the common channel invitation;
    provide the common channel invitation to the one or more users;
    monitor whether the one or more users access the shared collaborative channel via the invitation link;
    in response to detection of at least one of the one or more users accessing the shared collaborative channel via the invitation link, allow the at least one user to access at least some content of the shared collaborative channel until the common channel invitation expires;
    determine whether the at least one user has redeemed the common channel invitation via the invitation link; and
    in response to determination that the at least one user has redeemed the common channel invitation, add the at least one user as a confirmed member to a roster of the shared collaborative channel.

8. The computing device of claim 7, wherein to allow the at least one user to access at least some content of the shared collaborative channel comprises causing the computing device to allow the at least one user to access the at least some content of the shared collaborative channel until the common channel invitation expires.

9. The computing device of claim 7, wherein the at least one member is an external user outside of a resource tenant where the shared collaborative channel is hosted.

10. The computing device of claim 7, wherein the at least some content of the shared collaborative channel is less than all of the content of the shared collaborative channel.

11. The computing device of claim 7, wherein the limited set of permissions authorize the at least one user to access the at least some content of the shared collaborative channel as a provisional member of the shared collaborative channel.

12. The computing device of claim 11, wherein the plurality of instructions stored thereon that, when executed by the processor, further causes the computing device to provide the limited set of permissions prior to redeeming of the common channel invitation to the at least one user until the at least one user redeems the common channel invitation via the invitation link.

13. The computing device of claim 7, wherein the common channel invitation includes a message with a description of the shared collaborative channel and an expiration indication for the common channel invitation.

14. A non-transitory computer-readable medium storing instructions for inviting an external user to join a shared collaborative channel, the instructions when executed by one or more processors of a computing device, cause the computing device to:
  generate a common channel invitation for one or more users, wherein the common channel invitation includes an invitation link to a shared collaborative channel, a selectable option to redeem the common channel invitation to the shared collaboration channel, and a message with a description of the shared collaborative channel and an expiration indication for the common channel invitation;
  cause the common channel invitation to be transmitted to the one or more users;
  monitor whether the one or more users access the shared collaborative channel via the invitation link;
  in response to detection of at least one of the one or more users accessing the shared collaborative channel via the invitation link, allow the at least one user to access at least some content of the shared collaborative channel until the common channel invitation expires;
  determine whether the at least one user has redeemed the common channel invitation via the invitation link; and
  in response to determination that the at least one user has redeemed the common channel invitation, add the at least one user as a confirmed member to a roster of the shared collaborative channel.

15. The non-transitory computer-readable medium of claim 14, wherein to allow the at least one user to access at least some content of the shared collaborative channel comprises causing the computing device to allow the at least one user to access at least some content of the shared collaborative channel until the common channel invitation expires.

16. The non-transitory computer-readable medium of claim 14, wherein the at least one member is an external user outside of a resource tenant where the shared collaborative channel is hosted.

17. The non-transitory computer-readable medium of claim 14, wherein the at least some content of the shared collaborative channel is less than all of the content of the shared collaborative channel.

18. The non-transitory computer-readable medium of claim 14, wherein the common channel invitation is associated with a limited set of permissions for the at least one user who accesses the shared collaborative channel via the invitation link, and wherein the limited set of permissions authorize the at least one user to access the at least some content of the shared collaborative channel as a provisional member of the shared collaborative channel.

19. The non-transitory computer-readable medium of claim 14, wherein the common channel invitation includes a message with a description of the shared collaborative channel and an expiration indication for the common channel invitation.

* * * * *